(12) United States Patent
Graziosi et al.

(10) Patent No.: US 12,400,370 B2
(45) Date of Patent: Aug. 26, 2025

(54) MESH PATCH SYNTAX

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 87 days.

(21) Appl. No.: 17/987,848

(22) Filed: Nov. 15, 2022

(65) Prior Publication Data
US 2023/0306644 A1    Sep. 28, 2023

Related U.S. Application Data

(60) Provisional application No. 63/269,912, filed on Mar. 25, 2022.

(51) Int. Cl.
*G06T 17/20* (2006.01)
*G06T 9/00* (2006.01)
(Continued)

(52) U.S. Cl.
CPC .............. *G06T 9/001* (2013.01); *G06T 17/20* (2013.01)

(58) Field of Classification Search
CPC ......... G06T 9/001; G06T 9/20; G06T 11/003; G06T 15/00; G06T 15/08; G06T 15/10; G06T 17/05; G06T 2200/32; G06T 3/40; G06T 3/4038; G06T 5/00; G06T 17/20; H04N 13/161; H04N 19/20; H04N 19/46; H04N 19/107; H04N 19/70; H04N 19/597

See application file for complete search history.

(56) References Cited

U.S. PATENT DOCUMENTS

| | | | |
|---|---|---|---|
| 11,450,030 B2 * | 9/2022 | Mammou | G06T 3/4038 |
| 11,948,338 B1 * | 4/2024 | Mammou | G06T 9/001 |

(Continued)

OTHER PUBLICATIONS

Danillo Graziosi (Sony) et al: "[V-PCC][EE2.6-related] Mesh Patch Data", 132. MPEG Meeting; Oct. 12, 2020-Oct. 16, 2020; Online; (Motion Picture Expert Group or ISO/IEC JTC1/SC29/WG11 ), No. m55368 Oct. 7, 2020 (Oct. 7, 2020), XP030292889.

(Continued)

*Primary Examiner* — Wesner Sajous
(74) *Attorney, Agent, or Firm* — Haverstock & Owens, A Law Corporation

(57) ABSTRACT

New syntax elements are used to extend patch types, and the syntax is added to the V3C standard. The new syntax defines patches that encode meshes by projecting connected triangles to a 2D surface, patches that encode triangles or triangle strips without any projection, or patches that are tracked over time and are encoded by projecting connected triangles to a 2D surface. Furthermore, the syntax allows for different ways of coding the mesh-specific information. For instance, the syntax enables three different encoding methods for the vertex position: explicit (directly added to the atlas stream), embedded on video data (occupancy map data), or encoded using an external mesh encoder.

18 Claims, 4 Drawing Sheets

Encoding a mesh using patches. — 500

Performing an encoding implementation for vertex position. — 502

(51) Int. Cl.
  *G06T 19/00* (2011.01)
  *H04N 13/161* (2018.01)
  *H04N 19/20* (2014.01)
  *H04N 19/70* (2014.01)

(56) References Cited

U.S. PATENT DOCUMENTS

| | | | | |
|---|---|---|---|---|
| 2021/0217203 | A1* | 7/2021 | Kim | G06T 9/001 |
| 2022/0108482 | A1* | 4/2022 | Graziosi | G06T 9/001 |
| 2022/0108483 | A1* | 4/2022 | Graziosi | G06T 17/20 |
| 2022/0326138 | A1* | 10/2022 | Howell | G01N 15/1459 |
| 2023/0030913 | A1* | 2/2023 | Mammou | G06T 3/4038 |
| 2023/0094734 | A1* | 3/2023 | Kim | H04N 19/30 375/240.12 |
| 2023/0298217 | A1* | 9/2023 | Rondao Alface | H04N 21/816 382/232 |
| 2023/0386087 | A1* | 11/2023 | Marvie | G06T 9/001 |
| 2023/0401755 | A1* | 12/2023 | Mammou | G06T 9/001 |

OTHER PUBLICATIONS

Danillo B Graziosi (Sony) et al: "[V-CG] Sony's Dynamic Mesh Coding Call for Proposal Response", 138. MPEG Meeting; Apr. 25, 2022-Apr. 29, 2022; Online; (Motion Picture Expert Group or ISO/IEC JTC1/SC29/WG11), No. m59284 Mar. 25 202: (Mar. 25, 2022), XP030300727.

Danillo Graziosi (Sony) et al: "[V-PCC][EE2.6-related] Triangle Patch Data", 132. MPEG Meeting; Oct. 12, 2020-Oct. 16, 2020; Online; (Motion Picture Expert Group or ISO/IEC JTC1/SC29/WG11 ), No. m55370 Oct. 7, 2020 (Oct. 7, 2020), XP030292892.

Danillo Graziosi (Sony) et al: "[V-PCC][EE2.6-related] Tracked Patch Data", 132. MPEG Meeting; Oct. 12, 2020-Oct. 16, 2020; Online; (Motion Picture Expert Group or ISO/IEC JTC1/SC29/WG11 ), No. m55372 Oct. 7, 2020 (Oct. 7, 2020), XP030292895.

Sungryeul Rhyu et al: "[V-PCC] [New Proposal] V-PCC extension for mesh coding" 126. MPEG Meeting; Mar. 25, 2019-Mar. 29, 2019; Geneva; (Motion Picture Expert Group or ISO/IEC JTC1/SC29/WG11 ), No. m47608 Mar. 20, 2019 (Mar. 20, 2019), XP030211702.

Esmaeil Faramarzi (Samsung) et al: "[V-PCC] Report on EE4FE 2.6 mesh coding with V-PCC", 131. MPEG Meeting; Jun. 29, 2020-Jul. 3, 2020; Online; (Motion Picturi Expert Group or ISO/IEC JTC1/SC29/WG11 ), No. m54687 Jun. 23, 2020 (Jun. 23, 2020), XP030289252.

\* cited by examiner

TRIANGLE PRIMITIVES

MESH PATCH SYNTAX

CROSS-REFERENCE TO RELATED APPLICATION(S)

This application claims priority under 35 U.S.C. § 119(e) of the U.S. Provisional Patent Application Ser. No. 63/269,912, filed Mar. 25, 2022 and titled, "MESH PATCH SYNTAX," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

New syntax elements are used to extend patch types, and the syntax is added to the V3C standard. The new syntax defines patches that encode meshes by projecting connected triangles to a 2D surface, patches that encode triangles or triangle strips without any projection, or patches that are tracked over time and are encoded by projecting connected triangles to a 2D surface. Furthermore, the syntax allows for different ways of coding the mesh-specific information. For instance, the syntax enables three different encoding methods for the vertex position: explicit (directly added to the atlas stream), embedded on video data (occupancy map data), or encoded using an external mesh encoder.

In one aspect, a method programmed in a non-transitory memory of a device comprises encoding a mesh using patches and performing an encoding implementation for vertex position selected from: directly adding vertex position information to an atlas stream, embedding the vertex position information on video data, or using an external mesh coder. Encoding the mesh using patches comprises projecting connected triangles to a two dimensional surface. Encoding the mesh using patches comprises using patches that encode triangles or triangle strips without any projection. Encoding the mesh using patches comprises using patches that are tracked over time and are encoded by projecting connected triangles to a two dimensional surface. The video data comprises occupancy map data. Performing the encoding implementation for vertex position includes delta information for geometry correction. The method further comprises encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.

In another aspect, an apparatus comprises a non-transitory memory for storing an application, the application for: encoding a mesh using patches and performing an encoding implementation for vertex position selected from: directly adding vertex position information to an atlas stream, embedding the vertex position information on video data, or using an external mesh coder and a processor coupled to the memory, the processor configured for processing the application. Encoding the mesh using patches comprises projecting connected triangles to a two dimensional surface. Encoding the mesh using patches comprises using patches that encode triangles or triangle strips without any projection. Encoding the mesh using patches comprises using patches that are tracked over time and are encoded by projecting connected triangles to a two dimensional surface. The video data comprises occupancy map data. Performing the encoding implementation for vertex position includes delta information for geometry correction. The apparatus further comprises encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.

In another aspect, a system comprises one or more cameras for acquiring three dimensional content and an encoder configured for: encoding a mesh using patches and performing an encoding implementation for vertex position selected from: directly adding vertex position information to an atlas stream, embedding the vertex position information on video data, or using an external mesh coder. Encoding the mesh using patches comprises projecting connected triangles to a two dimensional surface. Encoding the mesh using patches comprises using patches that encode triangles or triangle strips without any projection. Encoding the mesh using patches comprises using patches that are tracked over time and are encoded by projecting connected triangles to a two dimensional surface. The video data comprises occupancy map data. Performing the encoding implementation for vertex position includes delta information for geometry correction. The system further comprises encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.

DETAILED DESCRIPTION OF THE PREFERRED EMBODIMENT

Figure 1:
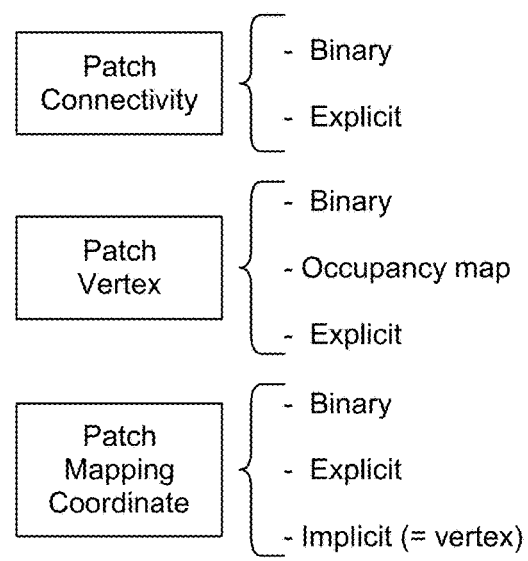
FIG. 1 illustrates a diagram of mesh patch data syntax according to some embodiments.

New syntax elements are used to extend patch types, and the syntax is added to the V3C standard. The new syntax defines patches that encode meshes by projecting connected triangles to a 2D surface, patches that encode triangles or triangle strips without any projection, or patches that are tracked over time and are encoded by projecting connected triangles to a 2D surface. Furthermore, the syntax allows for different ways of coding the mesh-specific information. For instance, the syntax enables three different encoding methods for the vertex position: explicit (directly added to the atlas stream), embedded on video data (occupancy map data), or encoded using an external mesh encoder.

An alternative way to represent the mesh information using existing patches syntax elements is to use mesh extensions, similar to what was done for MIV. This also results in minimal impact to the V3C specification. The text herein shows what would be added to the specification. For instance, the mesh patch type could be an extension of the patch data unit, as indicated herein:

| patch_data_unit( tileID, patchIdx ) { | Descriptor |
|---|---|
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| if( asps_mesh_extension_present_flag ) | |
| pdu_mesh_extension( tileID, patchIdx ) /* Specified in ISO/IEC 23090-? */ | |
| } | |

The triangle patch could be an extension of the raw patch data, as demonstrated below:

| raw_patch_data_unit( tileID, patchIdx ) { | Descriptor |
|---|---|
| if( AuxTileHeight[ TileIDToIndex[ tileID ] ] > 0) | |
| rpdu_patch_in_auxiliary_video_flag[ tileID ][ patchIdx ] | u(1) |
| rpdu_2d_pos_x[ tileID ][ patchIdx ] | ue(v) |
| rpdu_2d_pos_y[ tileID ][ patchIdx ] | ue(v) |
| rpdu_2d_size_x_minus1[ tileID ][ patchIdx ] | ue(v) |
| rpdu_2d_size_y_minus1[ tileID ][ patchIdx ] | ue(v) |
| rpdu_3d_offset_u[ tileID ][ patchIdx ] | u(v) |
| rpdu_3d_offset_v[ tileID ][ patchIdx ] | u(v) |
| rpdu_3d_offset_d[ tileID ][ patchIdx ] | u(v) |
| rpdu_points_minus1[ tileID ][ patchIdx ] | ue(v) |
| if( asps_mesh_extension_present_flag ) | |
| rpdu_mesh_extension( tileID, patchIdx )/* Specified in ISO/IEC 23090-? */ | |
| } | |

And finally, the tracked mesh patch type could be an extension of the inter patch data, as demonstrated below:

| inter_patch_data_unit( tileID, patchIdx ) { | Descriptor |
|---|---|
| if( NumRefIdxActive > 1 ) | ue(v) |
| ipdu_ref_index[ tileID ][ patchIdx ] | se(v) |
| ipdu_patch_index[ tileID ][ patchIdx ] | se(v) |
| ipdu_2d_pos_x[ tileID ][ patchIdx ] | se(v) |
| ipdu_2d_pos_y[ tileID ][ patchIdx ] | se(v) |
| ipdu_2d_delta_size_x[ tileID ][ patchIdx ] | se(v) |
| ipdu_2d_delta_size_y[ tileID ][ patchIdx ] | se(v) |
| ipdu_3d_offset_u[ tileID ][ patchIdx ] | se(v) |
| ipdu_3d_offset_v[ tileID ][ patchIdx ] | se(v) |
| ipdu_3d_offset_d[ tileID ][ patchIdx ] | se(v) |
| if( asps_normal_axis_max_delta_value_enabled_flag ) | |
| ipdu_3d_range_d[ tileID ][ patchIdx ] | se(v) |
| if( asps_plr_enabled_flag ) | |
| plr_data( tileID, patchIdx ) | |
| if( asps_mesh_extension_present_flag ) | |
| ipdu_mesh_extension( tileID, patchIdx ) /* Specified in ISO/IEC 23090-? */ | |
| } | |

The extensions contain the specific mesh information associated with each patch. The syntax allows for the following encoding options:
- two types of connectivity coding: explicit coding (with each triangle represented by 3 or 4 vertex indices in the patch data), or binary coding (where an external encoder is used);
- three types of vertices encoding: explicit coding (where the two coordinates indicate the position in the patch, from where the third coordinate will be derived), embedded in occupancy map (which will carry a symbol to identify the position of the vertex in the patch), or binary coding (using an external encoder);
- and three types of UV coordinates encoding: explicit encoding (sending the coordinates inside the patch data), implicit encoding (assumes it has the same value as the patch position of the corresponding vertex), or binary (using an external mesh encoder).

FIG. 1 illustrates a diagram of mesh patch data syntax according to some embodiments. Patch connectivity is able to be encoded using a binary implementation or an explicit implementation. Patch vertices are able to be encoded using a binary implementation, an occupancy map implementation or an explicit implementation. Patch mapping coordinates are able to be encoded using a binary implementation, an explicit implementation or an implicit implementation.

The new syntax elements and semantics are described herein:

| pdu_mesh_extension( tileID, patchIdx ) { | Descriptor |
|---|---|
| if( asps_mesh_binary_coding_enabled_flag ) | |
|   mpdu_binary_object_present_flag[ tileID ][ patchIdx ] | u(1) |
| if( mpdu_binary_object_present_flag[ tileID ][ patchIdx ]) { | |
|   mpu_mesh_binary_object_size_bytes[ tileID ][ patchIdx ] | ue(v) |
|   for( i = 0; i < mpdu_mesh_payload_size_bytes[ tileID ][ patchIdx ]; i++ ) | |
|     mpdu_mesh_binary_object[ tileID ][ patchIdx ][ i ] | b(8) |
| } else { | |
|   mpdu_vertex_count_minus3[ tileID ][ patchIdx ] | ue(v) |
|   mpdu_face_count[ tileID ][ patchIdx ] | ue(v) |
|   for( i = 0; i < mpdu_faces_count[ tileID ][patchIdx ]; i++ ) { | |
|     for( k = 0; k < asps_mesh_quad_face_flag ? 4:3 ; k++ ) { | u(v) |
|       mpdu_face_vertex[ tileID ][ patchIdx ][ i ][k] | |
|     } | |
|   if( !asps_mesh_vertices_in_occupancy_video_data ) { | |
|     for( i = 0; i < mpdu_vertex_count_minus3[ tileID ][ patchIdx ] +3 ; i++ ) { | |
|       mpdu_vertex_pos_x[ tileID ][ patchIdx ][ i ] | u(v) |
|       mpdu_vertex_pos_y[ tileID ][ patchIdx ][ i ] | u(v) |
|       if( !asps_mesh_vertices_delta_z_present_flag ) { | |
|         mpdu_vertex_pos_delta_z[ tileID ][ patchIdx ][ i ] | se(v) |
|       } | |
|     } | |
|   if( asps_mesh_uv_coordinates_present_flag ) { | |
|     for( i = 0; i < mpdu_vertex_count_minus3[ tileID ][ patchIdx ] +3 ; i++ ) { | |
|       mpdu_vertex_u_coord[ tileID ][ patchIdx ][ i ] | u(v) |
|       mpdu_vertex_v_coord[ tileID ][ patchIdx ][ i ] | u(v) |
|     } | |
|   } | |
| } | |
| } | | mpdu_binary_object_present_flag[tileID][p] equal to 1 specifies that the syntax elements mpdu_mesh_binary_object_size_bytes[tileID][p] and mpdu_mesh_binary_object[tileID][p][i] are present for the patch with index p of the current atlas tile, with tile ID equal to tileID. If mpdu_binary_object_present_flag[tileID][p] is equal to 0, the syntax elements mpdu_mesh_binary_object_size_bytes[tileID][p] and mpdu_mesh_binary_object[tileID][p][i] are not present for the current patch. If mpdu_binary_object_present_flag [tileID][p] is not present, its value shall be inferred to be equal to 0.

mpdu_mesh_binary_object_size_bytes[tileID][p] specifies the number of bytes used to represent the mesh information in binary form for the patch with index p of the current atlas tile, with tile ID equal to tileID.

mpdu_mesh_binary_object[tileID][p][i] specifies the i-byte of the binary representation of the mesh for patch with index p of the current atlas tile, with tile ID equal to tileID.

mpdu_vertex_count_minus3[tileID][p] plus 3 specifies the number of vertices present in the patch with index p of the current atlas tile, with tile ID equal to tileID.

mpdu_face_count[tileID][p] specifies the number of triangles present in the patch with index p of the current atlas tile, with tile ID equal to tileID. When not present, the value of mpdu_face_count[tileID][p] shall be zero.

mpdu_face_vertex[tileID][p][i][k] specifies the k-th value of the vertex index for the i-th triangle or quad for the current patch with index p of the current atlas tile, with tile ID equal to tileID. The value of mpdu_face_vertex[tileID][p][i][k] shall be in the range of 0 to mpdu_vert_count_minus3 [tileID][p]+2, inclusive.

mpdu_vertex_pos_x[tileID][p][i] specifies the value of the x-coordinate of the i-th vertex for the current patch with index p of the current atlas tile, with tile ID equal to tileID. The value of mpdu_vertex_pos_x[p][i] shall be in the range of 0 to mpdu_2d_size_x_minus1[tileID][p], inclusive.

mpdu_vertex_pos_y[tileID][p][i] specifies the value of the y-coordinate of the i-th vertex for the current patch p of the current atlas tile, with tile ID equal to tileID. The value of mpdu_vertex_pos_y[tileID][p][i] shall be in the range of 0 to mpdu_2d_size_y_minus1[tileID][p], inclusive.

mpdu_vertex_pos_delta_z[tileID][p][i] specifies the value of the difference between the value derived from the geometry video and the z-coordinate of the i-th vertex for the current patch p of the current atlas tile, with tile ID equal to tileID.

mpdu_vertex_u_coord[tileID][p][i] specifies the value of the u-coordinate of the mapping of the i-th vertex for the current patch with index p of the current atlas tile, with tile ID equal to tileID. The value of mpdu_vertex_u_coord[p][i] shall be in the range of 0 to range of 0 to $2^{asps\_mesh\_coordinates\_bit\_depth\_minus1+1}-1$, inclusive.

mpdu_vertex_pos_y[tileID][p][i] specifies the value of the y-coordinate of the i-th vertex for the current patch p of the current atlas tile, with tile ID equal to tileID. The value of mpdu_vertex_pos_y[tileID][p][i] shall be in the range of 0 to range of 0 to $2^{asps\_mesh\_coordinates\_bit\_depth\_minus1+1}-1$, inclusive.

Figure 2:
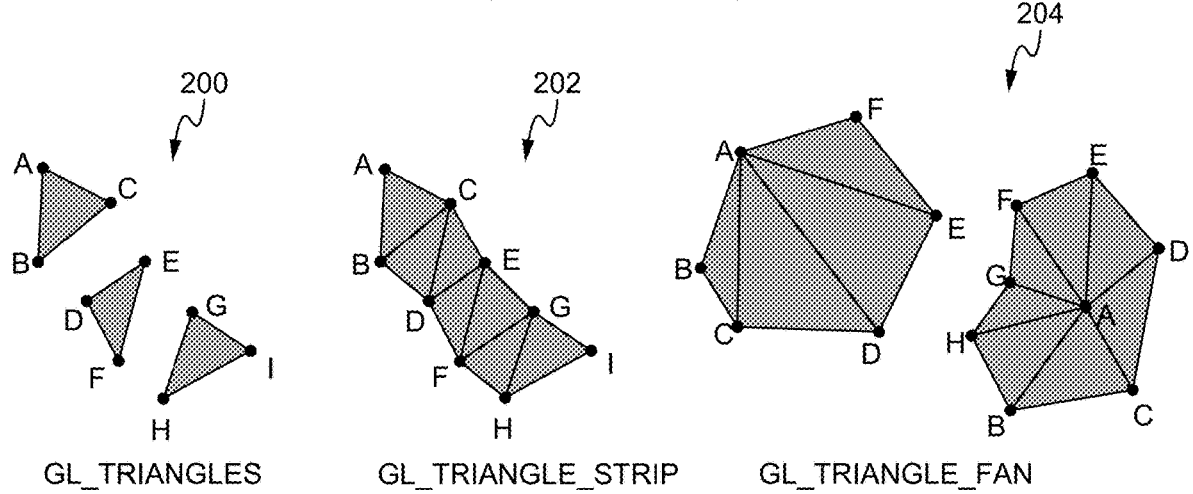
FIG. 2 illustrates a diagram of triangles primitives according to some embodiments.

FIG. 2 illustrates a diagram of triangles primitives according to some embodiments. The triangles are able to be configured as separate triangles 200, a triangle strip 202, or a triangle fan 204. Other triangle configurations are possible as well.

Figure 3:
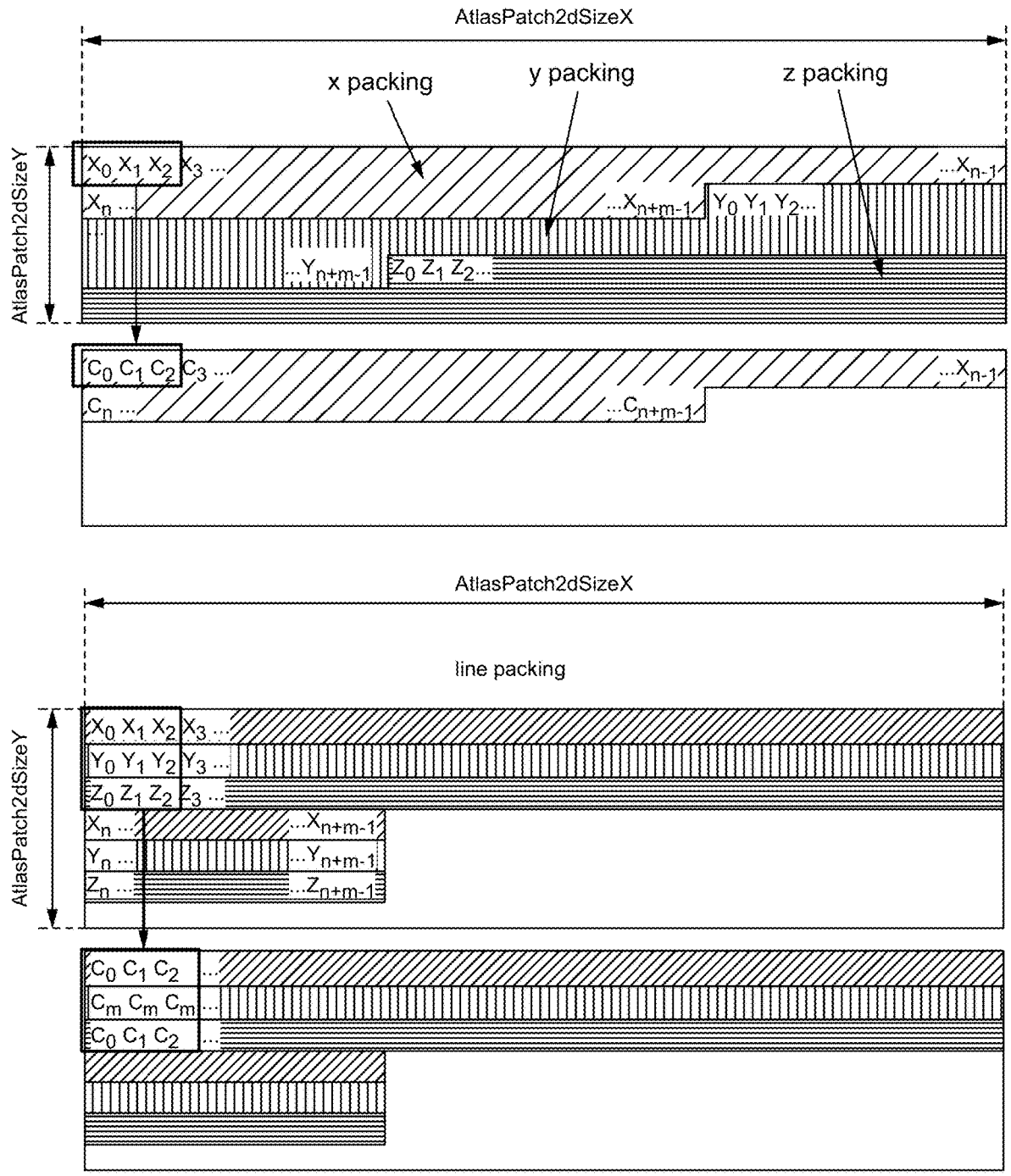
FIG. 3 illustrates a diagram of color expansion according to some embodiments.

FIG. 3 illustrates a diagram of color expansion according to some embodiments. With color expansion there is an x, y and z packing implementation and a line packing implementation.

| rpdu_mesh_extension( tileID, patchIdx ) { | Descriptor |
|---|---|
| tpdu_vertices_minus3[ tileID ][ patchIdx ] | ue(v) |
| tpdu_primitive_idc[ tileID ][ patchIdx ] | u(8) |
| tpdu_color_expansion_flag[ tileID ][ patchIdx ] | u(1) | tpdu_vertices_minus3[tileID][p] plus 3 specifies the number of vertices present in the triangle coded patch with index p in the current atlas tile, with tile ID equal to tileID. The value of tpdu_vertices_minus3[tileID][p] shall be in the range of 0 to (((tpdu_2d_size_x_minus1[tileID][p]+1)*(tpdu_2d_size_y_minus1[tileID][p]+1))/3−3, inclusive.

tpdu_primitive_idc[tileID][p] indicates the geometry primitive that defines how triangles are obtained from the vertices present in the coded patch with index p in the current atlas tile, with tile ID equal to tileID. If tpdu_primitive_idc[tileID][p] is not present, its value shall be inferred to be equal to 0.

tpdu_color_expansion_flag[tileID][p] equal to 1 specifies that the coordinates of the vertices are packed line-interleaved, and the color values are expanded for the current patch p of the current atlas tile, with tile ID equal to tileID. If tpdu_color_expansion_flag[tileID][p] is equal to 0, the coordinates of the vertices are packed sequentially, and the color is not expanded for the current patch. If tpdu_color_expansion_flag[tileID][p] is not present, its value shall be inferred to be equal to 0.

Figure 4:
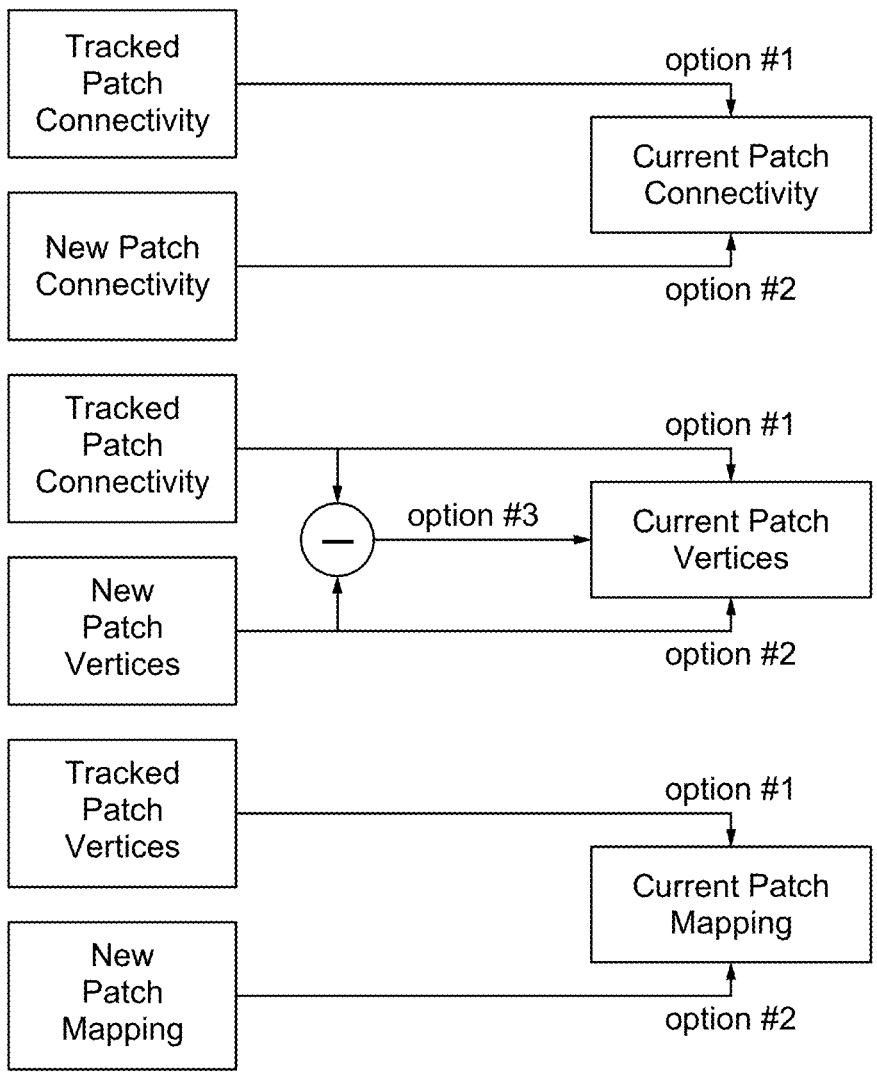
FIG. 4 illustrates a diagram of tracked mesh patch data syntax according to some embodiments.

FIG. 4 illustrates a diagram of tracked mesh patch data syntax according to some embodiments.

| ipdu_mesh_extension( tileID, patchIdx ) { | Descriptor |
|---|---|
| tmpdu_rotation_present_flag[ tileID ][ patchIdx ] | u(1) |
| if(tmpdu_rotation_present_flag[ tileID ][ patchIdx ]) { | |
| tmpdu_3d_rotation_qx[ tileID ] [ patchIdx ] | i(16) |
| tmpdu_3d_rotation_qy[ tileID ] [ patchIdx ] | i(16) |
| tmpdu_3d_rotation_qz[ tileID ] [ patchIdx ] | i(16) |
| } | |
| tmpdu_connectivity_changed_flag[ tileID ][ patchIdx ] | u(1) |
| if(!tmpdu_connectivity_changed_flag[ tileID ][ patchIdx ]g) { | |
| if( !asps_mesh_vertices_in_occupancy_video_data ) { | |
| tmpdu_vertices_change_position_flag[ tileID ][ patchIdx ] | u(1) |
| if( tmpdu_vertices_change_position_flag[ tileID ][ patchIdx ]){ | |
| for( i = 0; i < VertexCount[tileId][ RefIdx ] ; i++ ) { | |
| tmpdu_vertex_delta_pos_x[ tileID ] [ patchIdx ][ i ] | se(v) |
| tmpdu_vertex_delta_pos_y[ tileID ] [ patchIdx ][ i ] | se(v) |
| if( !asps_mesh_vertices_delta_z_present_flag ) { | |
| tmpdu_vertex_pos_delta_z[ tileID ][ patchIdx ][ i ] | se(v) |
| } | |
| } | |
| } | |
| } else { | |
| if( asps_mesh_binary_coding_enabled_flag ) { | |
| tmpdu_binary_object_present_flag[ tileID ][ patchIdx ] | u(1) |
| if( tmpdu_binary_object_present_flag[ tileID ][ patchIdx ] ) { | |
| tmpdu_mesh_binary_object_size_bytes[ tileID ][ patchIdx ] | ue(v) |
| for( i = 0; i < tmpdu_mesh_payload_size_bytes[ tileID ][ patchIdx ]; i++ ) | |
| tmpdu_mesh_binary_object[ tileID ][ patchIdx ][ i ] | b(8) |
| } else { | |
| tmpdu_vertex_count_minus3[ tileID ][ patchIdx ] | ue(v) |
| tmpdu_face_count[ tileID ][ patchIdx ] | ue(v) |
| for( i = 0; i < tmpdu_faces_count [ tileID ][ patchIdx ]; | |

-continued

| ipdu_mesh_extension( tileID, patchIdx ) { | Descriptor |
|---|---|
| i++ ) { | |
|    for( k = 0; k < asps_mesh_quad_face_flag ? 4:3 ; k++ ) { | |
|       tmpdu_face_vertex[ tileID ][ patchIdx ][ i ][ ] | u(v) |
|    } | |
|    if( !asps_mesh_vertices_in_occupancy_video_data ) { | |
|       for( i = 0; i < tmpdu_vertex_count_minus3[ tileID ][ patchIdx ]+3 ; i++ ) { | |
|          tmpdu_vertex_pos_x[ tileID ][ patchIdx ][ i ] | u(v) |
|          tmpdu_vertex_pos_y[ tileID ][ patchIdx ][ i ] | u(v) |
|          if( !asps_mesh_vertices_delta_z_present_flag ) { | |
|             tmpdu_vertex pos_delta_z[ tileID ][ patchIdx ][ i ] | se(v) |
|          } | |
|       } | |
|    if( asps_mesh_uv_coordinates_present_flag ) { | |
|       for( i = 0; i < mpdu_vertex_count_minus3[ tileID ][ patchIdx ] +3 ; i++ ) { | |
|          tmpdu_vertex_u_coord[ tileID ][ patchIdx ][ i ] | u(v) |
|          tmpdu_vertex_v_coord[ tileID ][ patchIdx ][ i ] | u(v) |
|       } | |
|    } | |
|   } | |
| } | | tmpdu_rotation_present_flag[t][p] equal to 1 indicates that rotation parameters for the patch with index p and tile with tile ID t are present. tmpdu_rotation_present_flag[t][p] equal to 0 indicates that rotation parameters for the patch with index p and tile with tile ID t are not present. When tmpdu_rotation_present_flag[t][p] is not present, it shall be inferred to be equal to 0.

tmpdu_3d_rotation_qx[t][p] specifies the x component, qX, for the geometry rotation of the patch with index p and tile with tile ID t using the quaternion representation. The value of tmpdu_3d_rotation_qx[t][p] shall be in the range of $-2^{14}$ to $2^{14}-1$, inclusive. When tmpdu_3d_rotation_qx[t][p] is not present, its value shall be inferred to be equal to 0. The value of qX is computed as follows:

$$qX = \text{tmpdu\_3d\_rotation\_qx}, 2^{14}$$

tmpdu_3d_rotation_qy[t][p] specifies the y component, qY, for the geometry rotation of the patch with index p and tile with tile ID t using the quaternion representation. The value of tmpdu_3d_rotation_qy[t][p] shall be in the range of $-2^{14}$ to $2^{14}-1$, inclusive. When tmpdu_3d_rotation_qy[t][p] is not present, its value shall be inferred to be equal to 0. The value of qY is computed as follows:

$$qY = \text{tmpdu\_3d\_rotation\_qy}, 2^{14}$$

tmpdu_3d_rotation_qz[t][p] specifies the z component, qZ, for the geometry rotation of the patch with index p and tile with tile ID t using the quaternion representation. The value of tmpdu_3d_rotation_qz[t][p] shall be in the range of $-2^{14}$ to $2^{14}-1$, inclusive. When tmpdu_3d_rotation_qz[t][p] is not present, its value shall be inferred to be equal to 0. The value of qZ is computed as follows:

$$qZ = \text{tmpdu\_3d\_rotation\_qz}, 2^{14}$$

The fourth component, qW, for the geometry rotation of the patch with index p and tile with tile ID t using the quaternion representation is calculated as follows:

$$qW = \text{Sqrt}(1-(qX^2+qY^2+qZ^2))$$

A unit quaternion can be represented as a rotation matrix R as follows:

$$RotationMatrix = \begin{bmatrix} 1-2*(qY^2+qZ^2) & 2*(qX*qY-qZ*qW) & 2*(qX*qZ+qY*qW) & 0 \\ 2*(qX*qY+qZ*qW) & 1-2*(qX^2+qZ^2) & 2*(qY*qZ-qX*qW) & 0 \\ 2*(qX*qZ-qY*qW) & 2*(qY*qZ+qX*qW) & 1-2*(qX^2+qY^2) & 0 \\ 0 & 0 & 0 & 1 \end{bmatrix}$$

tmpdu_vertices_changed_position_flag[t][p] equal to 1 indicates the vertices displacement for the patch with index p and tile with tile ID t are present. tmpdu_vertices_changed_position_flag[t][p] equal to 0 indicates that the vertices displacement for the patch with index p and tile with tile ID t are not present. When tmpdu_vertices_changed_position_flag[t][p] is not present, it shall be inferred to be equal to 0.

tmpdu_vertex_delta_pos_x[t][p][i] specifies the difference of the x-coordinate values of the i-th vertex of patch with index p and tile with tile ID t and the matched patch indicated by tmpdu_ref_index[t][p]. The value of tmpdu_vertex_pos_x[t][p][i] shall be in the range of 0 to 2afps_num_bits_vertex_delta_x−1, inclusive.

tmpdu_vertex_delta_pos_y[t][p][i] specifies the difference of the y-coordinate values of the i-th vertex of patch with index p and tile with tile ID t and the matched patch indicated by tmpdu_ref_index[t][p]. The value of tmpdu_vertex_pos_y[t][p][i] shall be in the range of 0 to 2afps_num_bits_vertex_delta_y−1, inclusive.

tmpdu_vertex_pos_delta_z[tileID][p][i] specifies the value of the difference between the value derived from the geometry video and the z-coordinate of the i-th vertex for the current patch p of the current atlas tile, with tile ID equal to tileID.

tmpdu_binary_object_present_flag[tileID][p] equal to 1 specifies that the syntax elements tmpdu_mesh_binary_object_size_bytes[tileID][p] and tmpdu_mesh_binary_object[tileID][p][i] are present for the patch with index p of the current atlas tile, with tile ID equal to tileID. If tmpdu_binary_object_present_flag[tileID][p] is equal to 0, the syntax elements tmpdu_mesh_binary_object_size_bytes[tileID][p] and tmpdu_mesh_binary_object[tileID][p][i] are not present for the current patch. If tmpdu_binary_object_present_flag[tileID][p] is not present, its value shall be inferred to be equal to 0.

tmpdu_mesh_binary_object_size_bytes[tileID][p] specifies the number of bytes used to represent the mesh information in binary form for the patch with index p of the current atlas tile, with tile ID equal to tileID.

tmpdu_mesh_binary_object[tileID][p][i] specifies the i-byte of the binary representation of the mesh for patch with index p of the current atlas tile, with tile ID equal to tileID.

tmpdu_vertex_count_minus3[tileID][p] plus 3 specifies the number of vertices present in the patch with index p of the current atlas tile, with tile ID equal to tileID.

tmpdu_face_count[tileID][p] specifies the number of triangles present in the patch with index p of the current atlas tile, with tile ID equal to tileID. When not present, the value of tmpdu_face_count[tileID][p] shall be zero.

tmpdu_face_vertex[tileID][p][i][k] specifies the k-th value of the vertex index for the i-th triangle or quad for the current patch with index p of the current atlas tile, with tile ID equal to tileID. The value of tmpdu_face_vertex[tileID][p][i][k] shall be in the range of 0 to tmpdu_vert_count_minus3[tileID][p]+2, inclusive.

tmpdu_vertex_pos_x[tileID][p][i] specifies the value of the x-coordinate of the i-th vertex for the current patch with index p of the current atlas tile, with tile ID equal to tileID. The value of tmpdu_vertex_pos_x[p][i] shall be in the range of 0 to tmpdu_2d_size_x_minus1[tileID][p], inclusive.

tmpdu_vertex_pos_y[tileID][p][i] specifies the value of the y-coordinate of the i-th vertex for the current patch p of the current atlas tile, with tile ID equal to tileID. The value of tmpdu_vertex_pos_y[tileID][p][i] shall be in the range of 0 to tmpdu_2d_size_y_minus1[tileID][p], inclusive.

tmpdu_vertex_u_coord[tileID][p][i] specifies the value of the u-coordinate of the mapping of the i-th vertex for the current patch with index p of the current atlas tile, with tile ID equal to tileID. The value of tmpdu_vertex_u_coord[p][i] shall be in the range of 0 to range of 0 to $2^{asps\_mesh\_coordinates\_bit\_depth\_minus1+1}-1$, inclusive.

tmpdu_vertex_v_coord [tileID][p][i] specifies the value of the y-coordinate of the i-th vertex for the current patch p of the current atlas tile, with tile ID equal to tileID. The value of tmpdu_vertex_v_coord[tileID][p][i] shall be in the range of 0 to range of 0 to $2^{asps\_mesh\_coordinates\_bit\_depth\_minus1+1}-1$, inclusive.

In addition to the syntax elements described above, the following mesh extension is proposed by adding and also modifying the current Atlas Sequence Parameter Set:

| atlas_sequence_parameter_set_rbsp( ) { | Descriptor |
| --- | --- |
| asps_atlas_sequence_parameter_set_id | ue(v) |
| asps_frame_width | ue(v) |
| asps_frame_height | ue(v) |
| asps_geometry_3d_bit_depth_minus1 | u(5) |
| asps_geometry_2d_bit_depth_minus1 | u(5) |
| asps_log2_max_atlas_frame_order_cnt_lsb_minus4 | ue(v) |
| asps_max_dec_atlas_frame_buffering_minus1 | ue(v) |
| asps_long_term_ref_atlas_frames_flag | u(1) |
| asps_num_ref_atlas_frame_lists_in_asps | ue(v) |
| for( i = 0; i < asps_num_ref_atlas_frame_lists_in_asps; i++ ) | |
|    ref_list_struct( i ) | |
| asps_use_eight_orientations_flag | u(1) |
| asps_extended_projection_enabled_flag | u(1) |
| if( asps_extended_projection_enabled_flag ) | |
|    asps_max_number_projections_minus1 | ue(v) |
| asps_normal_axis_limits_quantization_enabled_flag | u(1) |
| asps_normal_axis_max_delta_value_enabled_flag | u(1) |
| asps_patch_precedence_order_flag | u(1) |
| asps_log2_patch_packing_block_size | u(3) |
| asps_patch_size_quantizer_present_flag | u(1) |
| asps_map_count_minus1 | u(4) |
| asps_pixel_deinterleaving_enabled_flag | u(1) |
| if( asps_pixel_deinterleaving_enabled_flag ) | |
|    for( j = 0; j <= asps_map_count_minus1; j++ ) | |
|      asps_map_pixel_deinterleaving_flag[ j ] | u(1) |
| asps_raw_patch_enabled_flag | (1) |
| asps_eom_patch_enabled_flag | u(1) |
| if( asps_com_patch_enabled_flag && asps_map_count_minus1 == 0 ) | |
|    asps_com_fix_bit_count_minus1 | u(4) |
| if( asps_raw_patch_enabled_flag \|\| asps_eom_patch_enabled_flag ) | |
|    asps_auxiliary_video_enabled_flag | u(1) |
| asps_plr_enabled_flag | u(1) |
| if( asps_plr_enabled_flag ) | |
|    asps_plr_information( asps_map_count_minus1 ) | |
| asps_vui_parameters_present_flag | u(1) |
| if( asps_vui_parameters_present_flag ) | |

| atlas_sequence_parameter_set_rbsp( ) { | Descriptor |
|---|---|
|    vui_parameters( ) | |
|  asps_extension_present_flag | u(1) |
|  if( asps_extension_present_flag ) { | |
|    asps_vpcc_extension_present_flag | u(1) |
|    asps_miv_extension_present_flag | u(1) |
|    asps_mesh_extension_present_flag | u(1) |
|    asps_extension_5bits | u(5) |
|  } | |
|  if( asps_vpcc_extension_present_flag ) | |
|    asps_vpcc_extension( ) /* Specified in Annex H */ | |
|  if( asps_miv_extension_present_flag ) | |
|    asps_miv_extension( ) /* Specified in ISO/IEC 23090-12 */ | |
|  if( asps_mesh_extension_present_flag ) | |
|    asps_mesh_extension( ) /* Specified in ISO/IEC 23090-? */ | |
|  if( asps_extension_5bits ) | |
|    while( more_rbsp_data( ) ) | |
|      asps_extension_data_flag | u(1) |
|  rbsp_trailing_bits( ) | |
| } | |

And the following semantics modifications:
asps_extension_present_flag equal to 1 specifies that the syntax elements asps_vpcc_extension_present_flag, asps_miv_extension_present_flag, asps_mesh_extension_present_flag and asps_extension_5bits are present in the atlas_sequence_parameter_set_rbsp( ) syntax structure. asps_extension_present_flag equal to 0 specifies that the syntax elements asps_vpcc_extension_present_flag, asps_miv_extension_present_flag, asps_mesh_extension_present_flag and asps_extension_5bits are not present.
asps_mesh_extension_present_flag equal to 1 specifies that the asps_mesh_extension( ) syntax structure is present in the atlas_sequence_parameter_set_rbsp( ) syntax structure. asps_mesh_extension_present_flag equal to 0 specifies that this syntax structure is not present.
When not present, the value of asps_mesh_extension_present_flag is inferred to be equal to 0. asps_extension_5bits equal to 0 specifies that no asps_extension_data_flag syntax elements are present in the ASPS RBSP syntax structure. When present, asps_extension_5bits shall be equal to 0 in bitstreams conforming to this version of this document. Values of asps_extension_5bits not equal to 0 are reserved for future use by ISO/IEC. Decoders shall allow the value of asps_extension_5bits to be not equal to 0 and shall ignore all asps_extension_data_flag syntax elements in an ASPS NAL unit. When not present, the value of asps_extension_5bits is inferred to be equal to 0.

The ASPS mesh extension is used to identify the mesh codec that is used for the binary coding of connectivity, the usage of quads, the presence of vertex data in occupancy map, and the explicit coding of mapping coordinates, as shown by the syntax and semantics below:

| asps_mesh_extension( ) { | Descriptor |
|---|---|
|    asps_mesh_binary_coding_enabled_flag | u(1) |
|    if( asps_mesh_binary_coding_enabled_flag ) | |
|      asps_mesh_binary_codec_id | u(8) |
|    asps_mesh_quad_face_flag | u(1) |
|    asps_mesh_vertices_in_occupancy_video_data_flag | u(1) |
|    asps_mesh_mapping_coordinates_present_flag | u(1) |
|    if( asps_mesh_mapping_coordinates_present_flag ) | |
|      asps_mesh_mapping_coordinates_bit_depth_minus1 | u(8) |
|    asps_mesh_vertices_delta_z_present_flag | u(1) |
| } | | asps_mesh_binary_coding_enabled_flag equal to 1 indicates that vertex and connectivity information associated to a patch is present in binary format. asps_mesh_binary_coding_enabled_flag equal to 0 specifies that the mesh vertex and connectivity data is not present in binary format. When not present, asps_mesh_binary_coding_enabled_flag is inferred to be 0. asps_mesh_binary_codec_id indicates the identifier of the codec used to compress the vertex and connectivity information for patch. asps_mesh_binary_codec_id shall be in the range of 0 to 255, inclusive.

| MeshCodec | asps_mesh_binary_codec_idc | Descriptor |
|---|---|---|
| SC3DM | 0 | SC3DM (MPEG) codec |
| Draco | 1 | Draco (Google) codec |
| Reserved | 4 . . . 255 | — | asps_mesh_quad_face_flag equal to 1 indicates that quads are used for the polygon representation. asps_mesh_quad_face_flag equal to 0 indicates that triangles are used for the polygon representation of meshes. When not present, the value of asps_mesh_quad_flag is inferred to be equal to 0.
asps_mesh_vertices_in_occupancy_video_data_flag equal to 1 indicates that the vertex information is present in occupancy video data.
asps_mesh_vertices_in_occupancy_video_data_flag equal to 0 indicates that vertex information is present in the patch data. When not present, the value of asps_mesh_vertices_in_occupancy_video_data_flag is inferred to be equal to 0.
asps_mesh_mapping_coordinates_present_flag equal to 1 indicates that mapping information associated to the vertices of a patch is present. asps_mesh_mapping_coordinates_present_flag equal to 0 specifies that the mapping information associated to the vertices of a patch is not present and shall be assumed equal to the vertex atlas position. When not present, asps_mesh_mapping_coordinates_present_flag is inferred to be 0.
asps_mesh_coordinates_bit_depth_minus1 plus 1 indicates the bit depth of the mapping information associated to the vertices of a patch. asps_mesh_coordinates_bit_depth_minus1 shall be in the range of 0 to 31, inclusive.
asps_mesh_vertices_delta_z_present_flag equal to 1 indicates that difference between the reconstructed z coordinate from geometry image and from the real value is present.

asps_mesh_vertices_delta_z_present_flag equal to 0 specifies that the difference value is not present and shall be assumed equal to 0. When not present, asps_mesh_vertices_delta_z_present_flag is inferred to be 0.

The vertex position conversion from atlas coordinates to 3D coordinates would be modified in the following way:
Inputs to the process are:
a variable pIdx, the patch index,
a variable depthValue, the depth of a point,
a variable x, the x atlas coordinate,
a variable y, the y atlas coordinate.
Output of the process is a 2D array, pos3D, of size 3, specifying the 3D coordinates of a point.
The following applies:
A variable oIdx is set to AtlasPatchOrientationIndex[pIdx].
Variables posX, posY, sizeX, sizeY, lodX, and lodY are assigned as follows:
posX=AtlasPatch2dPosX[pIdx]
posY=AtlasPatch2dPosY[pIdx]
deltaZ=AtlasPatch2dPosDeltaZ[pIdx]
sizeX=AtlasPatch2dSizeX[pIdx]
sizeY=AtlasPatch2dSizeY[pIdx]
lodX=AtlasPatchLoDScaleX[pIdx]
lodY=AtlasPatchLoDScaleY[pIdx]

The atlas coordinates (x, y) are converted to a local patch coordinate pair (u, v) as follows:

$$\begin{bmatrix} u \\ v \end{bmatrix} = R_o(oldx) * \begin{bmatrix} lodX & 0 \\ 0 & lodY \end{bmatrix} * \begin{bmatrix} x - posX \\ y - posY \end{bmatrix} + $$
$$R_s(oldx) * \begin{bmatrix} lodX & 0 \\ 0 & lodY \end{bmatrix} * \begin{bmatrix} sizeX - 1 \\ sizeY - 1 \end{bmatrix}$$

where Ro and Rs are specified (e.g., in a table).
The local patch coordinate pair (u, v) is converted to 3D coordinates as follows:

pos3D[AtlasPatchAxisU[pIdx]]=AtlasPatch3dOffsetU[pIdx]+u pos3D[AtlasPatchAxisV[pIdx]]=AtlasPatch3dOffsetV[pIdx]+v tempD=(1−2*AtlasPatchProjectionFlag[pIdx])*(depthValue+deltaZ)pos3D[AtlasPatchAxisD[pIdx]]=Max(0, AtlasPatch3dOffsetD[pIdx]+tempD)

Some V-MESH decoder implementations may choose to clip the reconstructed 3D coordinates to the range of 0 to (1<<(asps_geometry_3d_bit_depth_minus1+1))−1, inclusive. Other decoder implementations may apply the clipping operation after the 45 degrees transformation or the post-reconstruction process.

As described in U.S. patent application Ser. No. 17/987,833, which is hereby incorporated by reference in its entirety for all purposes, there are three ways of encoding vertex mapping information—implicit, explicit, binary. For the implicit implementation, if projecting on a 2D surface, then the projection is the same as the mapping. For example, the place hit when projecting on the projection surface is the UV coordinate. For the explicit implementation, even though projection is performed, a different coordinate is sent for the texture. For the binary implementation, the explicit information is encoded with an external encoder (e.g., Draco or AFX).

If binary coding is implemented, an external mesh encoder is able to be used to encode the patch mesh information. U and V are added on the ply, and the vertex mapping information is encoded with the ply. In some embodiments, delta information for the z coordinate is added. The delta information is able to be used for geometry correction.

Additional details regarding mesh compression are able to be found in U.S. patent application Ser. No. 17/322,662, filed May 17, 2021, titled "VIDEO BASED MESH COMPRESSION," U.S. Provisional Patent Application Ser. No. 63/088,705, filed Oct. 7, 2020 and titled, "VIDEO BASED MESH COMPRESSION" and U.S. Provisional Patent Application Ser. No. 63/087,958, filed Oct. 6, 2020 and titled, "VIDEO BASED MESH COMPRESSION," which are all hereby incorporated by reference in their entireties for all purposes. The 3D mesh or 2D patch mesh connectivity are able to be encoded using an occupancy map and exploiting temporal correlation utilizing the video based mesh compression.

Figure 5:
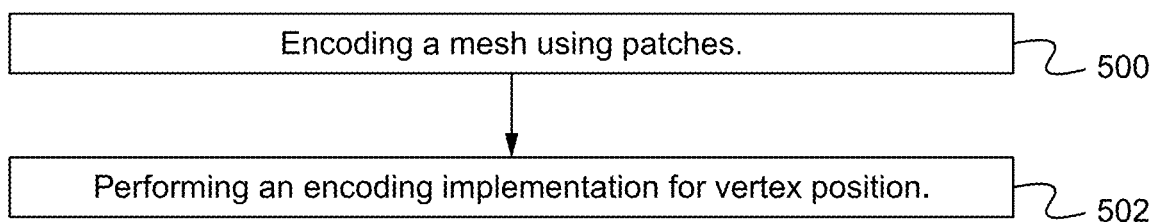
FIG. 5 illustrates a flowchart of a method of patch mesh coding according to some embodiments.

FIG. 5 illustrates a flowchart of a method of patch mesh coding according to some embodiments. In the step 500, a mesh is encoded using patches. Encoding the mesh using patches comprises projecting connected triangles to a two dimensional surface, using patches that encode triangles or triangle strips without any projection, or using patches that are tracked over time and are encoded by projecting connected triangles to a two dimensional surface. In the step 502, an encoding implementation is performed for vertex position selected from: directly adding vertex position information to an atlas stream, embedding the vertex position information on video data, or using an external mesh coder. Delta information is able to be sent for geometry correction. In some embodiments, the order of the steps is modified. In some embodiments, fewer or additional steps are implemented. For example, patch connectivity is encoded using a binary implementation or an explicit implementation; encoding patch vertices using a binary implementation, an occupancy map implementation or an explicit implementation; and encoding patch mapping coordinates using a binary implementation, an explicit implementation or an implicit implementation.

Figure 6:
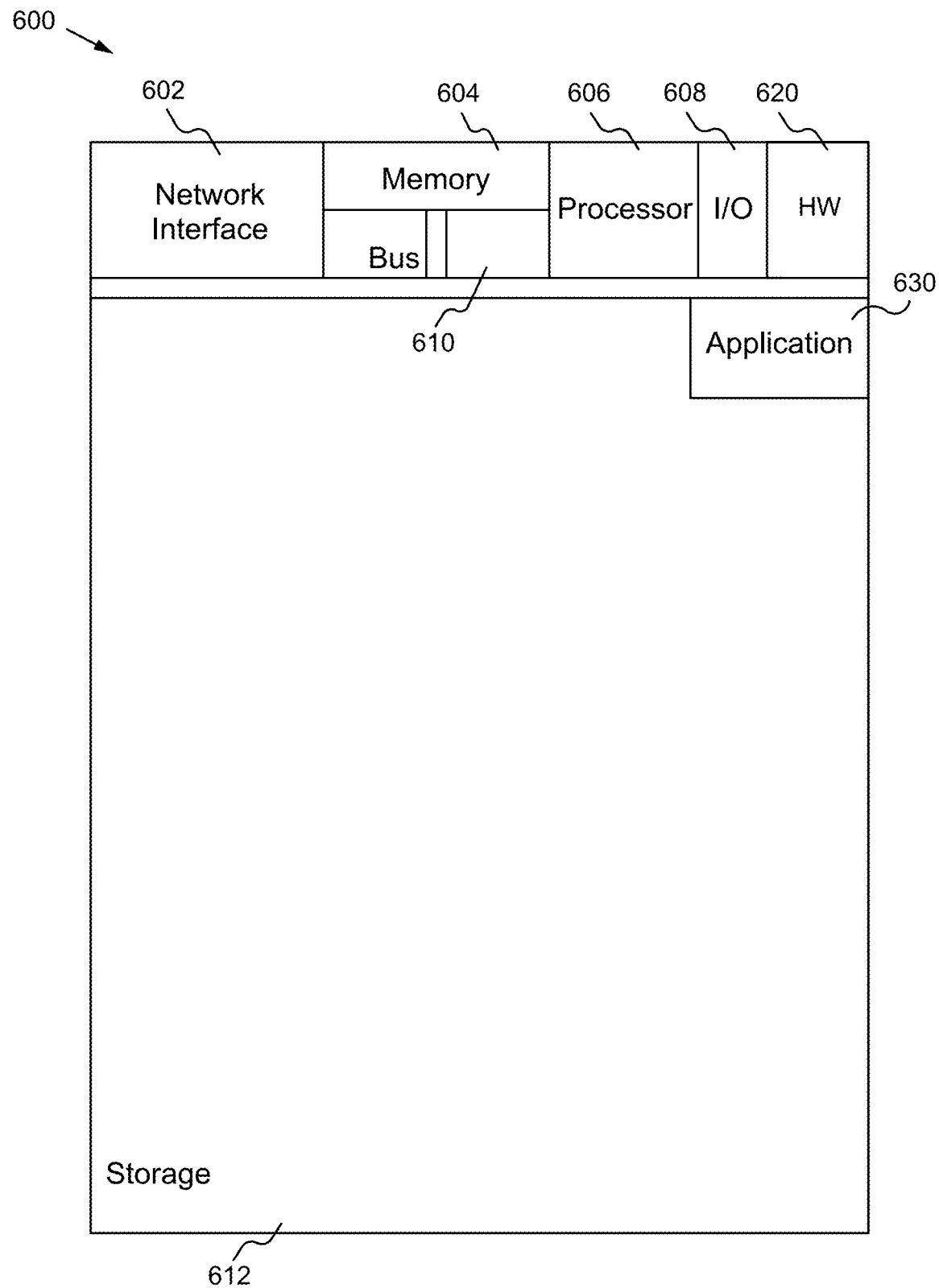
FIG. 6 illustrates a block diagram of an exemplary computing device configured to implement the patch mesh coding method according to some embodiments.

FIG. 6 illustrates a block diagram of an exemplary computing device configured to implement the patch mesh coding method according to some embodiments. The computing device 600 is able to be used to acquire, store, compute, process, communicate and/or display information such as images and videos including 3D content. The computing device 600 is able to implement any of the encoding/decoding aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Patch mesh coding application(s) 630 used to implement the patch mesh coding implementation are likely to be stored in the storage device 612 and memory 604 and processed as applications are typically processed. More or fewer components shown in FIG. 6 are able to be included in the computing device 600. In some embodiments, patch mesh coding hardware 620 is included. Although the computing device 600 in FIG. 6 includes applications 630 and hardware 620 for the patch mesh coding implementation, the patch mesh coding method is able to be implemented on a computing device in hardware, firmware, software or any combination thereof. For example, in some embodiments, the patch mesh coding applications 630 are programmed in a memory and executed using a processor. In another example, in some embodiments, the patch mesh coding hardware 620 is programmed hardware logic including gates specifically designed to implement the patch mesh coding method.

In some embodiments, the patch mesh coding application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the patch mesh coding method, a device acquires or receives 3D content (e.g., point cloud content). The patch mesh coding method is able to be implemented with user assistance or automatically without user involvement.

In operation, the patch mesh coding method enables more efficient and more accurate 3D content encoding compared to previous implementations.

Some Embodiments of Mesh Patch Syntax

1. A method programmed in a non-transitory memory of a device comprising:
    encoding a mesh using patches; and
    performing an encoding implementation for vertex position selected from: directly adding vertex position information to an atlas stream, embedding the vertex position information on video data, or using an external mesh coder.
2. The method of clause 1 wherein encoding the mesh using patches comprises projecting connected triangles to a two dimensional surface.
3. The method of clause 1 wherein encoding the mesh using patches comprises using patches that encode triangles or triangle strips without any projection.
4. The method of clause 1 wherein encoding the mesh using patches comprises using patches that are tracked over time and are encoded by projecting connected triangles to a two dimensional surface.
5. The method of clause 1 wherein the video data comprises occupancy map data.
6. The method of clause 1 wherein performing the encoding implementation for vertex position includes delta information for geometry correction.
7. The method of clause 1 further comprising encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.
8. An apparatus comprising:
    a non-transitory memory for storing an application, the application for:
        encoding a mesh using patches; and
        performing an encoding implementation for vertex position selected from: directly adding vertex position information to an atlas stream, embedding the vertex position information on video data, or using an external mesh coder; and
    a processor coupled to the memory, the processor configured for processing the application.
9. The apparatus of clause 8 wherein encoding the mesh using patches comprises projecting connected triangles to a two dimensional surface.
10. The apparatus of clause 8 wherein encoding the mesh using patches comprises using patches that encode triangles or triangle strips without any projection.
11. The apparatus of clause 8 wherein encoding the mesh using patches comprises using patches that are tracked over time and are encoded by projecting connected triangles to a two dimensional surface.
12. The apparatus of clause 8 wherein the video data comprises occupancy map data.
13. The apparatus of clause 8 wherein performing the encoding implementation for vertex position includes delta information for geometry correction.
14. The apparatus of clause 8 further comprising encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.
15. A system comprising:
    one or more cameras for acquiring three dimensional content; and
    an encoder configured for:
        encoding a mesh using patches; and performing an encoding implementation for vertex position selected from: directly adding vertex position information to an atlas stream, embedding the vertex position information on video data, or using an external mesh coder.
16. The system of clause 15 wherein encoding the mesh using patches comprises projecting connected triangles to a two dimensional surface.
17. The system of clause 15 wherein encoding the mesh using patches comprises using patches that encode triangles or triangle strips without any projection.
18. The system of clause 15 wherein encoding the mesh using patches comprises using patches that are tracked over time and are encoded by projecting connected triangles to a two dimensional surface.
19. The system of clause 15 wherein the video data comprises occupancy map data.
20. The system of clause 15 wherein performing the encoding implementation for vertex position includes delta information for geometry correction.
21. The system of clause 15 further comprising encoding patch connectivity using a binary implementation or an explicit implementation; encoding patch vertices using a binary implementation, an occupancy map implementation or an explicit implementation; and encoding patch mapping coordinates using a binary implementation, an explicit implementation or an implicit implementation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device, the method comprising:
   encoding a received mesh using patches;
   performing an encoding implementation for vertex position including: directly adding received vertex position information to an atlas stream, and embedding the received vertex position information on received video data, and by using an external mesh coder;
   encoding patch connectivity by using one of:
   a binary implementation including sending the patch connectivity to an external encoder, or
   an explicit implementation by representing triangles by three or four indices and storing the three or four indices in patch data;
   encoding patch vertices by using one of:
   the binary implementation by sending the patch connectivity to the external encoder,
   an occupancy map implementation including a symbol to identify a position of the vertex in the patch, or
   an explicit implementation where two coordinates indicate the position in the patch to derive a third coordinate; and
   encoding patch mapping coordinates by using one of:
   the binary implementation performed by sending the patch connectivity to the external encoder,
   an explicit implementation including sending the patch mapping coordinates inside the patch data or
   an implicit implementation by assuming the value as the patch position of a corresponding vertex,
   which results in encoded vertex position information.

2. The method of claim 1 wherein encoding the mesh using patches comprises projecting connected triangles to a two dimensional surface.

3. The method of claim 1 wherein encoding the mesh using patches comprises using patches that encode triangles or triangle strips without any projection.

4. The method of claim 1 wherein encoding the mesh using patches comprises using patches that are tracked over time and are encoded by projecting connected triangles to a two dimensional surface.

5. The method of claim 1 wherein the video data comprises occupancy map data.

6. The method of claim 1 wherein performing the encoding implementation for vertex position includes delta information for geometry correction.

7. An apparatus comprising:
   a non-transitory memory for storing an application, the application for:
   encoding a received mesh using patches;
   performing an encoding implementation for vertex position including: directly adding received vertex position information to an atlas stream, and embedding the received vertex position information on received video data, and by using an external mesh coder;
   encoding patch connectivity by using one of:
   a binary implementation including sending the patch connectivity to an external encoder, or
   an explicit implementation by representing triangles by three or four indices and storing the three or four indices in patch data;
   encoding patch vertices by using one of:
   the binary implementation by sending the patch connectivity to the external encoder,
   an occupancy map implementation including a symbol to identify a position of the vertex in the patch, or
   an explicit implementation where two coordinates indicate the position in the patch to derive a third coordinate; and
   encoding patch mapping coordinates by using one of:
   the binary implementation performed by sending the patch connectivity to the external encoder,
   an explicit implementation including sending the patch mapping coordinates inside the patch data or
   an implicit implementation by assuming the value as the patch position of a corresponding vertex,
   which results in encoded vertex position information; and
   a processor coupled to the memory, the processor configured for processing the application.

8. The apparatus of claim 7 wherein encoding the mesh using patches comprises projecting connected triangles to a two dimensional surface.

9. The apparatus of claim 7 wherein encoding the mesh using patches comprises using patches that encode triangles or triangle strips without any projection.

10. The apparatus of claim 7 wherein encoding the mesh using patches comprises using patches that are tracked over time and are encoded by projecting connected triangles to a two dimensional surface.

11. The apparatus of claim 7 wherein the video data comprises occupancy map data.

12. The apparatus of claim 7 wherein performing the encoding implementation for vertex position includes delta information for geometry correction.

13. A system comprising:
   one or more cameras for acquiring three dimensional content; and
   an encoder configured for:
   encoding a received mesh using patches;
   performing an encoding implementation for vertex position including: directly adding received vertex position information to an atlas stream, and embedding the received vertex position information on received video data, and by using an external mesh coder;
   encoding patch connectivity by using one of:
   a binary implementation including sending the patch connectivity to an external encoder, or
   an explicit implementation by representing triangles by three or four indices and storing the three or four indices in patch data;
   encoding patch vertices by using one of:
   the binary implementation by sending the patch connectivity to the external encoder,
   an occupancy map implementation including a symbol to identify a position of the vertex in the patch, or an explicit implementation where two coordinates indicate the position in the patch to derive a third coordinate; and encoding patch mapping coordinates by using one of:

the binary implementation performed by sending the patch connectivity to the external encoder, an explicit implementation including sending the patch mapping coordinates inside the patch data or an implicit implementation by assuming the value as the patch position of a corresponding vertex, which results in encoded vertex position information.

14. The system of claim 13 wherein encoding the mesh using patches comprises projecting connected triangles to a two dimensional surface.

15. The system of claim 13 wherein encoding the mesh using patches comprises using patches that encode triangles or triangle strips without any projection.

16. The system of claim 13 wherein encoding the mesh using patches comprises using patches that are tracked over time and are encoded by projecting connected triangles to a two dimensional surface.

17. The system of claim 13 wherein the video data comprises occupancy map data.

18. The system of claim 13 wherein performing the encoding implementation for vertex position includes delta information for geometry correction.

* * * * *